United States Patent [19]

Ronco

[11] 4,051,122
[45] Sept. 27, 1977

[54] DISAZO PIGMENTS CONTAINING TETRACARBOXYLIC ACID ESTER GROUPS

[75] Inventor: Karl Ronco, Riehen, Switzerland

[73] Assignee: Ciba-Geigy Corporation, Ardsley, N.Y.

[21] Appl. No.: 615,851

[22] Filed: Sept. 23, 1975

Related U.S. Application Data

[63] Continuation-in-part of Ser. No. 466,357, May 2, 1974, abandoned.

[30] Foreign Application Priority Data

May 16, 1973 Switzerland .................. 6966/73

[51] Int. Cl.² .................. C09B 33/14; C09B 43/12
[52] U.S. Cl. .................................. 260/174; 260/184
[58] Field of Search ............ 260/174, 177, 178, 184, 260/187, 188

[56] References Cited

U.S. PATENT DOCUMENTS 3,562,249  2/1971  Schnabel et al. .................. 260/184
3,691,149  9/1972  Mueller et al. .................. 260/174

Primary Examiner—Charles F. Warren
Attorney, Agent, or Firm—Vincent J. Cavalieri

[57] ABSTRACT

Disazo pigments of the formula

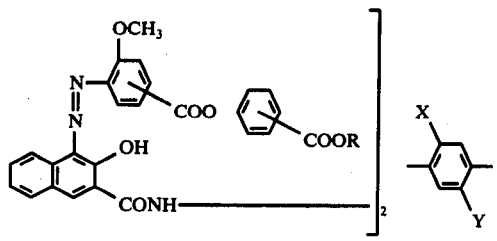

wherein R represents alkyl containing 1 to 6 carbon atoms, cyclohexyl or phenyl, and X and Y represent hydrogen, halogen, alkyl or alkoxy groups containing 1 to 4 carbon atoms which are useful for pigmenting high molecular organic material.

7 Claims, No Drawings

DISAZO PIGMENTS CONTAINING TETRACARBOXYLIC ACID ESTER GROUPS

This is a continuation-in-part application of my U.S. Pat. application Ser. No. 466,357 filed May 2, 1974 now abandoned.

The present invention provides valuable new disazo pigments of the formula

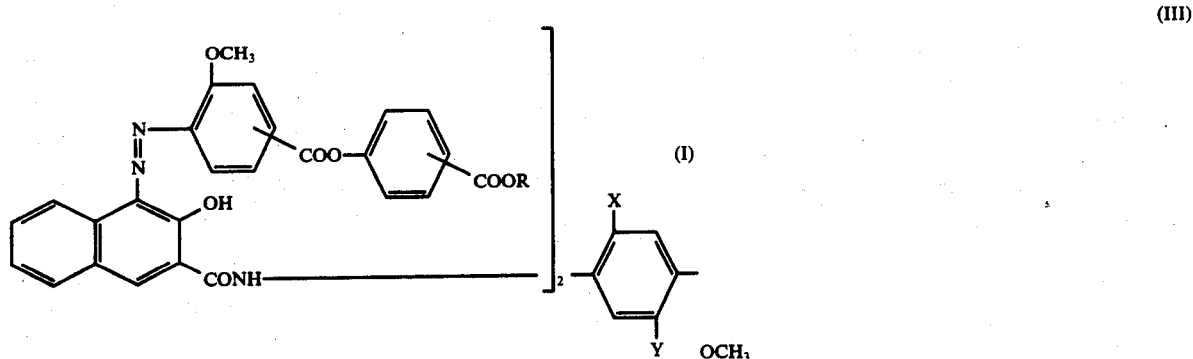

wherein R represents alkyl containing 1 to 6 carbon atoms, cycloalkyl containing 5 to 6 carbon atoms, or aryl, X and Y represents hydrogen, halogen, alkyl or alkoxy containing 1 to 4 carbon atoms. The disazo pigments according to the invention are obtained by a. condensing a carboxylic acid halide of the formula

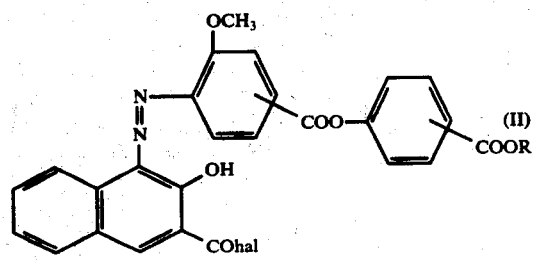

wherein hal represents halogen, especially chlorine or bromine with an aromatic diamine in the molar ratio 2:1, or b. coupling a diazo compound of an amine of the formula

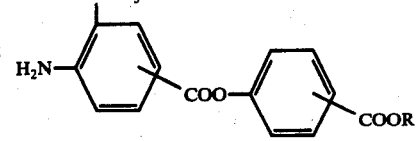

with a bis-naphthol of the formula

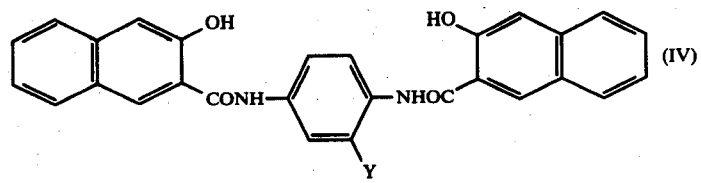

in the molar ration 2:1.

Particular interest attaches to pigments of the formula

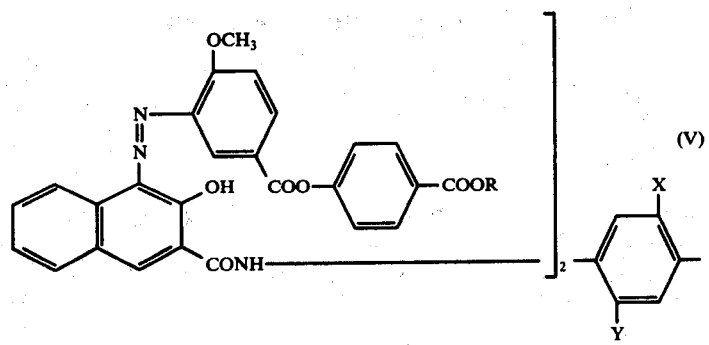

wherein R represents alkyl containing 1 to 4 carbon atoms, cyclohexyl or phenyl, and X and Y represent hydrogen, chlorine, methyl or methoxy.

Since the colourants according to the invention are pigments, they obviously must not contain water-solubilising groups, in particular acid water-solubilising groups, such as carboxylic acid or sulphonic acid groups.

As starting materials there are used preferably carboxylic acid chlorides of the formula

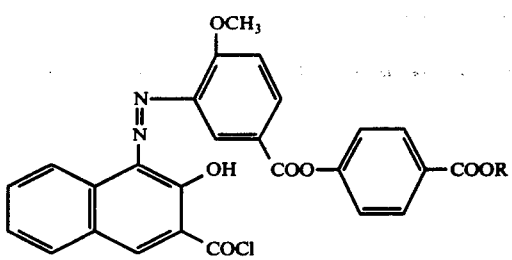

(VI)

wherein R represents phenyl, alkyl containing 1 to 4 carbon atoms or cyclohexyl.

The azo dyestuff carboxylic acids on which the acid halides to be used according to the invention are based, are obtained by coupling the diazo compound of an aminobenzoic acid ester of the formula

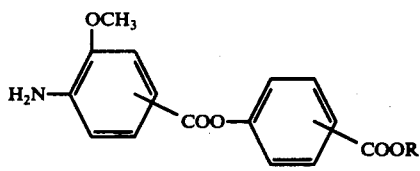

(VII)

with a 2,3-hydroxynaphthoic acid of the formula

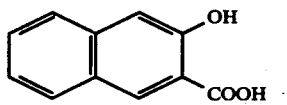

(VIII)

The aminobenzoic acid ester is obtained with advantage by condensation of a nitrobenzoyl chloride of the formula

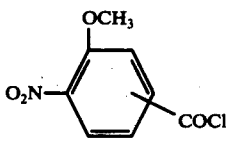

with a hydroxycarboxylic acid ester of the formula

and reduction of the resulting nitrocarboxylic acid ester to the aminocarboxylic acid ester.

A start is preferably made from chlorides of nitrocarboxylic acids of the formula

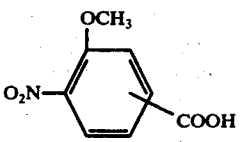

in particular from 4-methoxy-3-nitrobenzoic acid. As hydroxycarboxylic acid esters there are used, for example, aliphatic hydroxycarboxylic acid esters, e.g. the alkyl esters of hydroxyacetic acid of α-hydroxypropionic acid. Of particular importance, however, are the esters of hydroxybenzenecarboxylic acids, in particular those of the formula

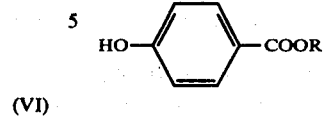

werein R has the indicated meaning.

As examples there may be cited:
salicylic acid methyl ester
salicylic acid ethyl ester
salicylic acid propyl ester
salicylic acid isopropyl ester
salicylic acid-n-butyl ester
3-hydroxybenzoic acid methyl ester
3-hydroxybenzoic acid ethyl ester
3-hydroxybenzoic acid propyl ester
3-hydroxybenzoic acid isopropyl ester
3-hydroxybenzoic acid-n-butyl ester
3-hydroxybenzoic acid isobutyl ester
3-hydroxybenzoic acid tert.butyl ester
3-hydroxybenzoic acid cyclohexyl ester
4-hydroxybenzoic acid methyl ester
4-hydroxybenzoic acid ethyl ester
4-hydroxybenzoic acid isopropyl ester
4-hydroxybenzoic acid-n-butyl ester
4-hydroxybenzoic acid isobutyl ester
4-hydroxybenzoic acid tert.butyl ester
4-hydroxybenzoic acid cyclohexyl ester The reduction of the resulting nitrobenzenecarboxylic acid esters is, for practical reasons, carried out catalytically.

The resulting aminobenzene carboxylic acid esters are diazotised and coupled with the 2,3-hydroxynaphthoic acids of the formula (VIII) to give the azo dyestuff carboxylic acids.

The azo dyestuff carboxylic acids obtained are treated with agents which are capable of converting carboxylic acids into their halides, e.g. the chlorides or bromides, in particular with phosphoric halides, for example phosphorus pentachloride or phosphorus trichloride or phosphorus pentabromide, phosphoroxy halides and preferably, with thionyl chloride.

The treatment with such acid halogenating agents is carried out for practical reasons in inert solvents, such as dimethyl formamide, chlorobenzenes, such as monochloro- or dichlorobenzene, toluene, xylene or nitrobenzene; in the case of the five last mentioned solvents, dimethyl formamide is optionally added. In the manufacture of the carboxylic acid halides, it is generally advantageous first to dry the azo compounds manufactured in aqueous medium or to free them from water azeotropically by boiling them in an organic solvent. If desired, the azeotropic drying can be effected immediately before the treatment with the acid halogenating agents.

The resulting azo dyestuff carboxylic acid chlorides are those of the formula

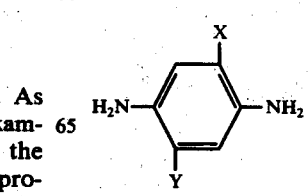

wherein X and Y represent hydrogen, alkyl or alkoxy containing 1 to 4 carbon atoms. The following amines may be cited as examples:

1,4-diaminobenzene, 1,4-diamino-2-chlorobenzene, 1,4-diamino-2-bromobenzene, 1,4-diamino-2,5-dichlorobenzene, 1,4-diamino-2-methylbenzene, 1,4-diamino-2,5-dimethylbenzene, 1,4-diamino-2-methoxybenzene, 1,4-diamino-2,5-dimethoxybenzene, 1,4-diamino-2,5-diethoxybenzene, 2-chloro-5-methoxy-1,4-phenylenediamine, 2-chloro-5-methoxy-1,4-phenylenediamine and 2-methyl-5-methoxy-1,4-phenylenediamine.

The condensation between the carboxylic acid halides of the kind mentioned at the outset and the aromatic diamines is expediently carried out in anhydrous medium. Under this condition, the condensation takes place as a rule with surprising ease at temperatures which lie in the boiling range of the normal organic solvents, for example, toluene, monochlorobenzene, dichlorobenzene, trichlorobenzene or nitrobenzene. In order to hasten the reaction it is in general advisable to use an acid acceptor, for example anhydrous sodium acetate or pyridine. The resulting pigments are partly crystalline and partly amorphous and are obtained in most cases in very good yield and in a pure state. It is advisable to first precipitate the acid chlorides obtained from the carboxylic acids. In many cases, however, precipitation of the acid chloride can without detriment be dispensed with and the condensation carried out directly after the manufacture of the carboxylic acid chlorides.

According to embodiment b) of the process according to the invention, the new pigments are obtained by coupling a diazo compound of an amine of the formula (III)

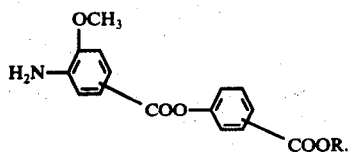

wherein R has the indicated meaning, with a coupling component of the formula (IV).

The coupling is effected by gradual addition of the aqueous-alkaline solution of the coupling component to the acid solution of the diazonium salt. The amount of alkali hydroxide to be used for dissolving the coupling component is appropriately so chosen that it suffices to neutralise the mineral acid liberated from the diazonium salt during coupling. The coupling is appropriately carried out at a pH from 4 to 6. The pH is advantageously adjusted by adding a buffer. Possible buffers are, for example, the salts, especially alkali salts, of formic acid, phosphoric acid or, in particular, acetic acid. The alkaline solution of the coupling component appropriately contains a wetting agent, a dispersing agent or an emulsifier, for example an aralkylsulphonate, such as dodecylbenzenesulphonate, or the sodium salt of 1,1'-naphthylmethanesulphonic acid, polycondensation products of alkylene oxides, such as the reaction product of ethylene oxide and p-tert.-octylphenol, and also alkyl esters of sulphoricinoleates, for example n-butyl sulphoricinoleate. The dispersion of the coupling component can also advantageously contain protective colloids, for example, methylcellulose, or minor amounts of inert organic solvents which are sparingly soluble or insoluble in water, for example optionally halogenated or nitrated aromatic hydrocarbons, for example, benzene, toluene, xylene, chlorobenzene, dichlorobenzenes or nitrobenzene, and also aliphatic halogenated hydrocarbons, for example, carbon tetrachloride or trichloroethylene, and furthermore organic solvents which are miscible with water, for example, acetone, ethylene glycol monomethyl ether, methyl ethyl ketone, methanol, ethanol or isopropanol.

The coupling can also advantageously be carried out by continuously combining an acid solution of the diazonium salt with an alkaline solution of the coupling component in a mixing nozzle, whereupon an immediate coupling of the component occurs. Care must be taken that the diazo component and the coupling component are present in equimolecular amounts in the mixing nozzle, but a small surplus of coupling component proves to be advantageous. This is most simply achieved by controlling the ph of the liquid in the mixing nozzle. It is also necessary to ensure that there is an intense turbulent mixing of the two solutions in the mixing nozzle. The resulting dyestuff dispersion is continuously withdrawn from the mixing nozzle and the dyestuff is separated off by filtration.

Finally, it is also possible to effect the coupling by suspending the amine to be diazotised with the coupling component in the molar ratio 2:1 in an organic solvent and treating the coupling mixture with a diazotising agent, in particular an ester of nitric acid, such as methyl, ethyl, butyl, amyl or octyl nitrite.

Owing to their insolubility, the resulting pigments can be isolated from the reaction mixtures by filtering them off. Since the by-products remain in solution, the resulting pigments are obtained in outstanding purity. An after-treatment with an organic solvent is indicated in the case of pigments which have been obtained by the aqueous coupling method. Further advantages of the process according to the invention are the high yield in which the pigments are obtained, their advantageous form from the point of view of pigment technology, and the constancy of their properties.

The new colouring materials constitute valuable pigments which, in finely divided form, may be used for pigmenting organic material of high molecular weight, for example cellulose ethers and esters, polyamides, polyurethanes or polyesters, acetyl cellulose, nitrocellulose, natural resins or artificial resins, such as polymerisation or condensation resins, for example aminoplasts, in particular urea and melamine/formaldehyde resins, alkyd resins, phenolic plastics, polycarbonates, polyolefines, such as polystyrene, polyvinyl chloride, polyethylene, polypropylene, polyacrylonitrile, polyacrylic esters, rubber, casein, silicon and silicon resins, individually or in mixtures.

It is immaterial whether the cited materials of high molecular weight are in the form of plastics, melts or in the form of spinning solutions, lacquers or printing inks. Depending on the use to which they are put, it is advantageous to use the new pigments as toners or in the form of preparations.

Compared with the pigments which are known from prior art as well as described in Swiss Pat. No. 477.521, the pigments according to the invention are characterised by an improved fastness to light and to weather.

The following Examples illustrate the invention, the parts and percentages being by weight unless otherwise stated.

EXAMPLE 1

26.4 parts of the monoazo dye obtained from diazotised 4-methoxy-3-aminobenzoic acid-4'-isopropoxycarbonyl-phenyl ester and 2,3-hydroxynaphthoic acid are suspended in 80 parts of o-dichlorobenzene. To this mixture are added 0.5 part of dimethyl formamide and 8 parts of thionyl chloride and the reaction mixture is heated with stirring to 110° C to 120° C over the course of 1½ hours. The dark brown solution is cooled to 10° C. The precipitated, non-crystalline compound is filtered with suction cold and washed with a small amount of o-dichlorobenzene. The product is then dried in vacuo at 50° C to 60° C to yield 20 parts of the azo dyestuff carboxylic acid chloride of the formula

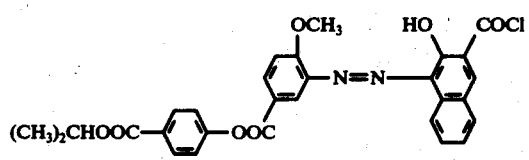

17.0 parts of this acid chloride are stirred with 300 parts of o-dichlorobenzene and treated at 30° C with a hot solution of 2 parts of 2,5-dimethyl-1,4-phenylenediamine in 100 parts of o-dichlorobenzene. The batch is heated with stirring to 140° C and condensed for 14 hours at 140° C–145° C. The reaction mixture is filtered hot, and the filter product is washed with hot o-dichlorobenzene, subsequently with methanol and then with water. It is dried in vacuo at 96°–100° C to yield 15.6 parts of a soft-grained, red pigment powder which colours plastics such as polyvinyl chloride, as well as lacquers, in brilliant red shades of excellent fastness to migration, over-lacquering, and light. The pigment due has the following structural formula

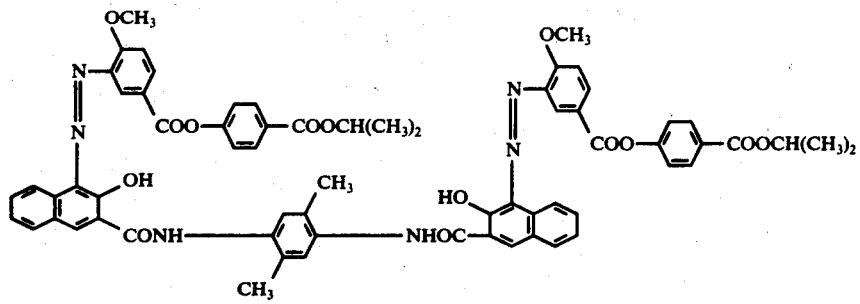

The diazo component can be obtained as follows:

4-methoxy-3-nitrobenzoyl chloride is condensed with 4-hydroxybenzoic acid isopropyl ester in monochlorobenzene in the presence of triethylamine. The resulting 4-methoxy-3-nitrobenzoic acid-4'-isopropoxycarbonyl-phenyl ester melts at 129°–130° C. This product is hydrogenated in ethanol in the presence of Raney nickel as catalyst. The resulting 4-methoxy-3-aminobenzoic acid-4'-isopropoxycarbonyl-phenyl ester melts at 110°–111° C and when analysed has the following values:

calculated: C, 65.60%; H, 5.78%; N, 4.2%; found: C, 65.53%; H, 5.84%; N, 4.05%.

The subsequent Table describes further acid amide derivatives of azo dyes which are obtained according to the particulars given hereinbefore by coupling the diazo compound of the amine listed in column I with the 2,3-hydroxynaphthoic acid of column II, converting the resulting axo dyestuff carboxylic acid into the acid chloride and condensing this latter in the molar ratio 2:1 with the diamine listed in column III. Column IV indicates the shade of a polyvinyl chloride sheet coloured with the respective pigment.

| Ex. | I | II | III | IV |
|---|---|---|---|---|
| 2 | 4-methoxy-3-amino-benzoic acid-4'-isopropoxycarbonyl-phenyl ester | 2,3-hydroxynaphthoic acid | 2-methoxy-5-chloro-p-phenylene-diamine | bluish red |
| 3 | " | " | 2,5-dimethoxy-p-phenylene-diamine | claret |
| 4 | " | " | 2,5-dichloro-p-phenylene-diamine | bluish red |
| 5 | " | " | 2-methyl-5-chloro-p-phenylene-diamine | bluish red |
| 6 | " | " | 2-methoxy-p-phenylene-diamine | bluish red |
| 7 | 4-methoxy-3-amino-benzoic acid-4'-ethoxycarbonyl-phenyl ester | " | " | bluish red |
| 8 | " | " | 2,5-dichloro-p-phenylene-diamine | bluish red |
| 9 | " | " | 2,5-dimethyl-p-phenylene-diamine | bluish red |
| 10 | 4-methoxy-3-amino-benzoic acid-4'-cyclohexyloxycarbonylphenyl ester | " | 2-methoxy-5-chloro-p-phenylene-diamine | bluish red |
| 11 | " | " | 2,5-dichloro-p-phenylene-diamine | bluish red |
| 12 | " | " | 2-methoxy-p-phenylene-diamine | bluish red |

EXAMPLE 13

0.6 g of the pigment manufactured according to Example 1, 67 g of polyvinyl chloride, 33 g of dioctyl phthalate, 2 g of dibutyl tin dilaurate and 2 g of titanium dioxide are mixed together and processed to a thin sheet in a roll mill for 15 minutes at 160° C. The resulting red colouration is strong and fast to migration, heat, weather and light.

EXAMPLE 14

10 g of titanium dioxide and 2 g of the pigment manufactured according to Example 1 are ground for 48 hours in a ball mill with 88 g of a mixture of 26.4 g of coconut alkyl resin, 24.0 g of melamine formaldehyde resin (50% solids content), 8.8 g of ethylene glycol monomethyl ether and 28.8 g of xylene.

This lacquer is sprayed on an aluminium sheet, pre-dried for 30 minutes at room temperature and then stoved for 30 minutes at 120° C, to give a red lacqering which is characterised by good strength and very good fastness to overlacqering, light and weather.

I claim:
1. Disazo pigment of the formula

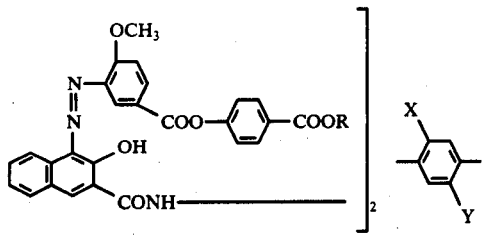

wherein R represents alkyl containing 1 to 6 carbon atoms, cyclohexyl or phenyl, and X and Y represent hydrogen, halogen, alkyl containing 1 to 4 carbon atoms or alkoxy containing 1 to 4 carbon atoms.

2. Disazo pigment according to claim 1 of the formula wherein R represents alkyl containing 1 to 4 carbon atoms, cyclohexyl or phenyl, and X and Y represent hydrogen, chlorine, methyl or methoxy.

3. The disazo pigment according to claim 2 of the formula

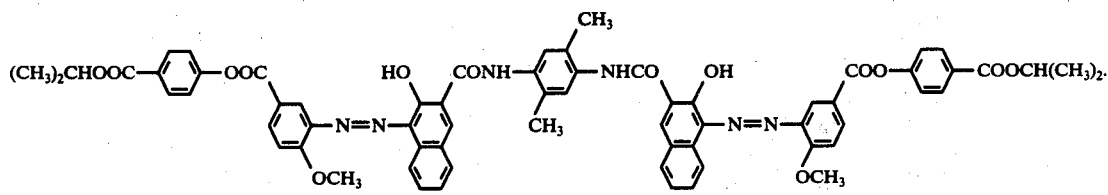

4. The disazo pigment according to claim 2 of the formula

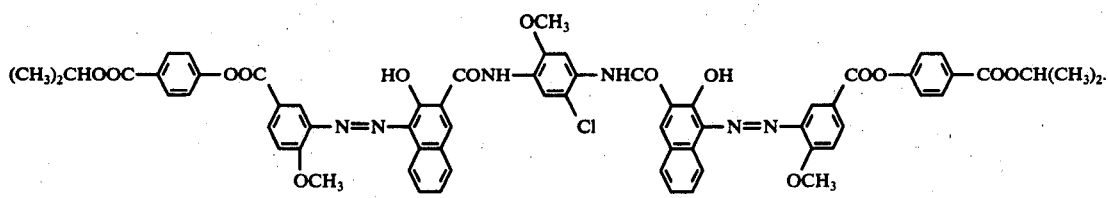

5. The disazo pigment according to claim 2 of the formula

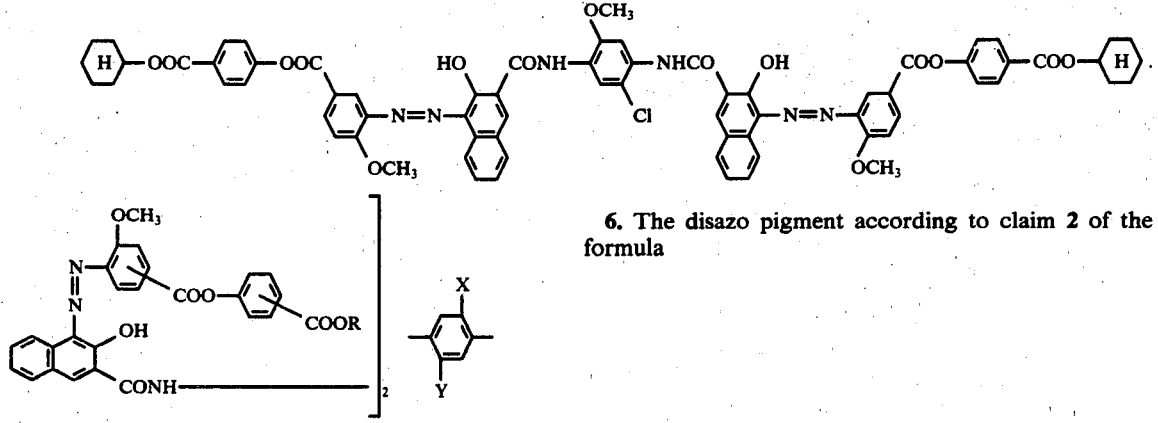

6. The disazo pigment according to claim 2 of the formula

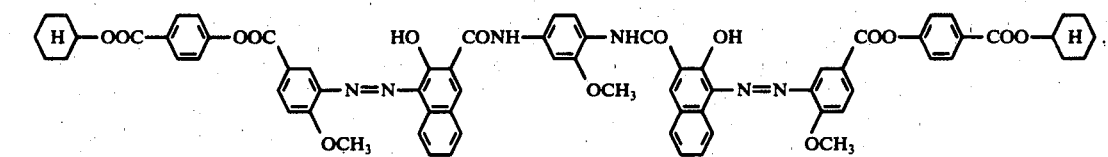

7. The disazo pigment to claim 2 of the formula
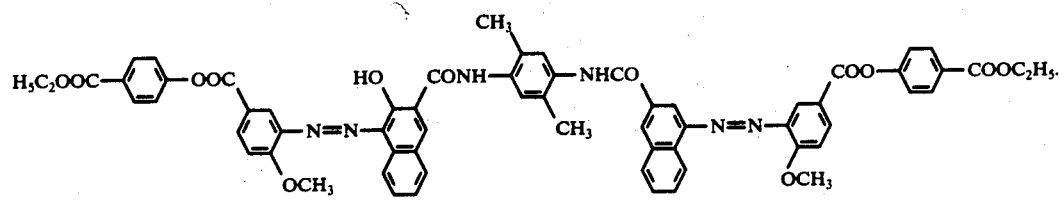
* * * * *